United States Patent [19]

Struckmeyer et al.

[11] Patent Number: 5,127,497
[45] Date of Patent: Jul. 7, 1992

[54] LIP SEAL RING WITH IMPROVED SEALING BOND

[75] Inventors: Horst F. Struckmeyer, Leverkusen; Hartmut Treiber, Langenfeld; Siegfried Pietsch; Wilhelm Liethen, both of Leverkusen, all of Fed. Rep. of Germany

[73] Assignee: Goetze AG, Burscheid, Fed. Rep. of Germany

[21] Appl. No.: 657,055

[22] Filed: Feb. 20, 1991

[30] Foreign Application Priority Data

Feb. 20, 1990 [DE] Fed. Rep. of Germany ....... 4005244

[51] Int. Cl.$^5$ .............................................. F16F 7/12
[52] U.S. Cl. .................. 188/322.17; 277/188 R; 92/165 R; 92/168
[58] Field of Search .............. 188/322.17; 277/188 R, 277/188 A, 205; 92/165 R, 168

[56] References Cited

U.S. PATENT DOCUMENTS

| | | | |
|---|---|---|---|
| 3,307,883 | 3/1967 | Wastenhagen | 92/168 |
| 3,856,287 | 12/1977 | Freitag | 277/188 R |
| 3,910,387 | 10/1975 | Nicholls | 188/322.17 |
| 4,736,824 | 4/1988 | Dony | 188/322.17 |
| 4,750,594 | 6/1988 | Siemann | 188/322.17 |
| 4,807,890 | 2/1989 | Gorman | 92/168 |
| 4,852,862 | 8/1989 | Bauer | 188/322.17 |
| 5,011,121 | 4/1991 | Oriola et al. | 92/168 |
| 5,015,000 | 5/1991 | Perini | 92/168 |
| 5,020,421 | 6/1991 | Podlesak | 92/168 |

FOREIGN PATENT DOCUMENTS 2822615 12/1980 Fed. Rep. of Germany .

Primary Examiner—Joseph F. Peters, Jr.
Assistant Examiner—Christopher P. Ellis
Attorney, Agent, or Firm—Spencer, Frank & Schneider

[57] ABSTRACT

A lip seal ring for circumferentially contacting and sealing a shaft movable relative to the lip seal ring includes an elastomer ring having a sealing lip and an adhering face and a stiffening ring made of a deformation-resistant material. The stiffening ring is bonded to the elastomer ring at the adhering face. The stiffening ring is made of a phenolic resin, a polyamide resin or a polyimide resin. The elastomer ring is made of an oil-resistant elastomer based on a nitrile-butadiene rubber or a derivative thereof, and polyethylene or polypropylene.

3 Claims, 1 Drawing Sheet

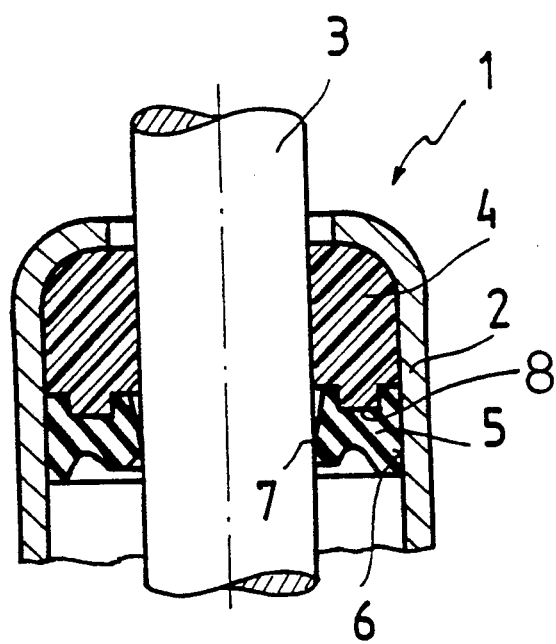

LIP SEAL RING WITH IMPROVED SEALING BOND

CROSS REFERENCE TO RELATED APPLICATION

This application claims the priority of German Application No. P 40 05 244.3 filed Feb. 20th, 1990, which is incorporated herein by reference.

BACKGROUND OF THE INVENTION

This invention relates to a lip seal ring for sealing rotary shafts or reciprocating piston rod-and-piston assemblies. The lip seal ring is of the type which has an elastomer sealing portion bonded by gluing or by vulcanization, to a housing ring or reinforcing ring made of a deformation-resistant material. Typically, such a construction may be used as a rod sealing ring for pneumatic springs and the like; it has an elastomer sealing lip portion and a face oriented away from the sealing lip portion and bonded to a reinforcing (stiffening) ring.

Elastomer lip seal rings used for sealing the piston rods in pneumatic springs are vulcanized to a metal disc at their radial end face oriented away from the sealing lip part, for an accurate positioning of the sealing lip and for stiffening to resist the substantial compression loads during operation. To instal the rod sealing ring, the latter is pressed onto the cylindrical rod guide of the pneumatic spring. The rod guide simultaneously serves as an end closure for the pneumatic spring tube. The elastomers of the rod sealing rings are preferably oil-resistant nitrile-butadiene rubbers or, at high temperature loads, fluoroelastomers, while for cylindrical rod guides preferably duroplastic synthetic materials ar used.

From the operational point of view it is of importance in sealing lip rings of the above-outlined type that a very firm bond be ensured between the elastomer and the housing or the stiffening part, particularly because of the large, alternating mechanical and thermal loads during operation and because of the corrosive sealing fluids that may be present. Because a rubber-to-metal or rubber-to-plastic bond is technologically difficult to achieve, in the manufacture of the lip seal rings the mutually adhering surfaces of the housing rings or stiffening rings have to be particularly carefully treated and sometimes coated with special adhering materials. These procedures render the manufacture of the lip seal rings complicated and expensive.

For simplifying the manufacture of elastomer rod sealing rings, the elastomer rod sealing ring portion is, according to German Patent No. 2,822,615, directly connected with the cylindrical rod guide so that an additional stiffening ring could be dispensed with. Such a solution however, still requires additional process steps for ensuring an optimal bond. Further, a pre-treatment of the adhering surfaces and the use of adhering means have been necessary and also, recesses as well as additional constructive measures had to be provided in separate process steps in the guide cylinder and/or the elastomer portion. Consequently, this solution has resulted in very few economic advantages—if any—in the manufacture of rod sealing systems.

SUMMARY OF THE INVENTION

It is an object of the invention to provide an improved lip seal ring of the above-outlined type which has optimal bonding properties and which is particularly adapted for simple and economical mass production. The invention seeks to provide a lip seal ring particularly for use in sealing piston rods of pneumatic springs.

This object and others to become apparent as the specification progresses, are accomplished by the invention, according to which, briefly stated, the housing portion or stiffening portion of the lip seal ring is made of a phenolic resin, polyamide resin or polyimide resin and whose elastomer sealing portion is made of an oil-resistant thermoplastic elastomer based on a nitrile-butadiene rubber or a derivative thereof with polyethylene and/or polypropylene.

According to a preferred embodiment of the invention, the synthetic resin used for the housing part or the stiffening part is a glass-fiber reinforced phenolic resin and the elastomer is a thermoplastic rubber based on a nitrile-butadiene rubber with polypropylene.

The lip seal rings of the above materials according to the invention were manufactured by injecting the elastomer material into a mold, onto the pre-made housing or stiffening part. With the material combinations used according to the invention there was achieved, in an economically advantageous manner, the functionally important optimal bond between elastomer and synthetic resin without the need for first preparing the synthetic resin parts for satisfactory adherence and without the need for using additional adhering materials. Upon testing the firmness of the bond in accordance with German Industrial Standard (DIN) 53531 in tension tests there were found only elastomer tears; breakages of adhering parts in the bounding layers of the bond have been absent. Apparently, the mutual penetration of molecules at the boundary surface (interdiffusion) plays a decisive role in the quality of the bond between elastomer and synthetic resin. By combining the selected elastomers and synthetic resins thus a mutually fine-tuned and compatible material combination has been found which makes possible an optimal bond by interdiffusion.

Thus, according to the invention, in the lip seal ring manufacture, as opposed to the conventional ring making, the expensive process steps involving a preparation of the adhering base and an addition of an adhering material are omitted. There is thus achieved a substantial economy by saving on the adhering materials, including adhering material solvents which occasionally pose a threat to the working safety and the environment. Further, because of the safe and no-waste manufacture of the bond, expensive tests within the framework of manufacturing inspections and quality control may be omitted.

It is a further advantage of the invention that the lip seal rings are mechanically and thermally stressable to a higher degree than the known lip seal rings which results in an increased service life.

By eliminating process steps in the manufacture, the manufacturing process of the lip seal rings may be more readily automated. In such automation, manufacturing processes may be particularly advantageously utilized wherein in the same mold first the resin components and then the elastomer components are injected and hardened, resulting in the desired resin-elastomer bond. In this manner, advantages are obtained especially in mass manufacture.

In the manufacture of rod seal rings for pneumatic springs, as known from the disclosure in the earliernoted German Patent No. 2,822,615, the elastomer part is directly connected with the cylindrical rod guide so that an additional vulcanization of a stiffening part on the elastomer part may be dispensed with. Since because of the used material combination according to the invention a superior bond between synthetic resin and elastomer is obtained, special structural measures for ensuring a good bond are not needed.

BRIEF DESCRIPTION OF THE DRAWING

The sole FIGURE illustrates a preferred embodiment of the invention in axial section.

DESCRIPTION OF THE PREFERRED EMBODIMENT

The FIGURE illustrates in cross section the upper end 1 of a pneumatic spring, having a piston rod 3 passing through a housing 2. The closure of the tube end 1 is formed by a stiffening ring 4. For sealing the rod 3 there is provided an elastomer rod seal ring 5 whose sealing lip 6 at the outer periphery of the sealing ring presses radially outwardly against the inner face of the housing 2, while the sealing lip 7 at the inner periphery of the sealing ring 5 slides in a dynamically sealing manner on the reciprocating rod 3.

The stiffening ring 4, which functions as a cylindrical rod guide, is made of fiber-glass reinforced phenolic resin and the elastomer rod sealing ring 5 is made of a thermoplastic, oil-resistant elastomer on the basis of nitrile-butadiene rubber with polypropylene. By virtue of the compatibility of the two materials, upon shaping the elastomer on the stiffening ring 4 in a vulcanizing mold, there can be obtained a firm and durable interdiffusion bond of the two components without previous handling of the adhering face 8 and without the inclusion of any additional adhering material. By virtue of the firm bond the stiffening ring 4 simultaneously functions as a stiffening part of the elastomer sealing part 5, so that, advantageously, vulcanized stiffening members that have been used heretofore are no longer required. Further, the bond of the two parts which may be easily manufactured, requires no additional and expensive structural measures at the stiffening ring 4 and at the sealing ring 5. The elastomer sealing ring 5 and the stiffening ring 4 form a structural unit constituted by the elastomer lip seal ring 5 and the stiffening ring 4 firmly bonded to the adhering face 8 of the lip seal ring 5.

It will be understood that the above description of the present invention is susceptible to various modifications, changes and adaptations, and the same are intended to be comprehended within the meaning and range of equivalents of the appended claims.

What is claimed is:

1. In a lip seal ring for circumferentially contacting and sealing a shaft movable relative to the lip seal ring; the lip seal ring including an elastomer ring having a sealing lip and an adhering face; the lip seal ring further including a stiffening ring made of a deformation-resistant material; said stiffening ring being bonded to said elastomer ring at said adhering face; the improvement wherein said stiffening ring is of a first material selected from the group consisting of a phenolic resin, a polyamide resin and a polyimide resin and further wherein said elastomer ring is formed of a second material; said second material being an oil-resistant elastomer selected from the group consisting of a thermoplastic nitrile-butadiene rubber and derivatives thereof; said second material including a third material selected from the group consisting of polyethylene and polypropylene.

2. A lip seal ring as defined in claim 1, wherein said first material is a fiber-glass reinforced phenolic resin, said second material is a nitrile-butadiene rubber and said third material is polypropylene.

3. A method of making a lip seal ring defined in claim 1, comprising the steps of placing said stiffening ring in a mold; introducing an elastomer mass, consisting of said second and third materials, into the mold; causing said elastomer mass to be formed on said stiffening ring and allowing said elastomer mass to harden to form said elastomer ring bonded to said stiffening ring.

* * * * *